United States Patent [19]

Mori et al.

[11] Patent Number: 5,699,251
[45] Date of Patent: Dec. 16, 1997

[54] CORRECTING THE WHEEL SPEED OF A WHEEL HAVING A DIFFERENT DIAMETER THAN OTHER WHEELS

[75] Inventors: Ryoji Mori; Hironobu Kiryu; Shuji Shiraishi, all of Wako, Japan

[73] Assignee: Honda Giken Kogyo Kabushiki Kaisha, Tokyo, Japan

[21] Appl. No.: 790,806

[22] Filed: Jan. 30, 1997

Related U.S. Application Data

[63] Continuation of Ser. No. 405,240, Mar. 17, 1995, abandoned.

[30] Foreign Application Priority Data

Mar. 18, 1994 [JP] Japan ............... 6-048755

[51] Int. Cl.$^6$ ............... B60T 8/58; B60C 23/00
[52] U.S. Cl. ............... 364/426.045; 364/426.018; 364/426.019; 340/442; 340/444; 303/163; 303/173
[58] Field of Search ............... 364/426.041, 426.045, 364/426.015, 426.018, 426.019, 426.024, 426.027, 565; 180/197, 233, 248; 340/441, 442, 444; 303/147, 163, 169, 173, 186; 73/146.2, 146.5

[56] References Cited

U.S. PATENT DOCUMENTS

| | | |
|---|---|---|
| 4,777,611 | 10/1988 | Tashiro et al. ............... 364/565 |
| 4,876,528 | 10/1989 | Walker et al. ............... 340/442 |
| 5,015,042 | 5/1991 | Yoshino ............... 303/96 |
| 5,019,984 | 5/1991 | Masaki et al. ............... 364/426.02 |
| 5,192,929 | 3/1993 | Walker et al. ............... 340/444 |
| 5,197,566 | 3/1993 | Watanabe et al. ............... 180/249 |
| 5,252,946 | 10/1993 | Walker et al. ............... 340/444 |
| 5,292,184 | 3/1994 | Takata ............... 303/100 |
| 5,312,169 | 5/1994 | Buschmann ............... 303/100 |
| 5,415,468 | 5/1995 | Latarnik et al. ............... 303/100 |
| 5,436,836 | 7/1995 | Holtz et al. ............... 364/426.02 |

FOREIGN PATENT DOCUMENTS

| | | |
|---|---|---|
| 4-121439 | 4/1992 | Japan. |
| WO-A-89 04783 | 6/1989 | WIPO. |

Primary Examiner—Kevin J. Teska
Assistant Examiner—Tan Nguyen
Attorney, Agent, or Firm—Nikaido Marmelstein Murray & Oram LLP

[57] ABSTRACT

A technique to indicate a different-diameter wheel such as a temporary tire and to accurately correct the wheel speed of the different-diameter wheel is determined. Wheel speeds of a pair of left and right driven wheels are detected by wheel speed sensors and wheel speeds of a pair of left and right follower wheels are detected by wheel speed sensors. Yaw rates are calculated from the wheel speeds of the left and right wheels, and yaw rates are calculated from the wheel speeds of the wheels located diagonally. Which wheel of the four wheels is a different-diameter wheel is determined based on the magnitudes of the four yaw rates and the wheel speed of the different-diameter wheel is corrected based on a ratio in wheel speed between the different-diameter wheel and the other wheels.

4 Claims, 6 Drawing Sheets

| Bit | 7 | 6 | 5 | 4 | 3 | 2 | 1 | 0 |
|---|---|---|---|---|---|---|---|---|
| Type of flag | Straight travel | Presence or absence of different diameter wheel | Position of different diameter wheel | | CRL 1 | CRL 2 | CRL 3 | CRL 4 |
| FR different diameter | 1 | 0 | 0 | 1 | 0 | 1 | 0 | 1 |
| FL different diameter | 1 | 0 | 1 | 0 | 0 | 1 | 1 | 0 |
| RR different diameter | 1 | 0 | 1 | 1 | 1 | 0 | 1 | 0 |
| RL different diameter | 1 | 0 | 0 | 0 | 1 | 0 | 0 | 1 |
| No different diameter wheel | 1 | 1 | 0 | 0 | 0 | 0 | 0 | 0 |

FIG.6

CORRECTING THE WHEEL SPEED OF A WHEEL HAVING A DIFFERENT DIAMETER THAN OTHER WHEELS

This application is a continuation of application Ser. No. 08/405,240 filed Mar. 17, 1995 now abandoned.

BACKGROUND OF THE INVENTION

1. Field of the Invention

The present invention relates to a vehicle wheel speed correcting system for use in a control device using a wheel speed as a control signal such as a traction control system or an ABS system, and more particularly, to a system for correcting the error of a wheel speed produced when a different-diameter wheel such as a temporary tire has been mounted on a vehicle.

2. Description of the Prior Art

A vehicle wheel speed correcting system is conventionally known which will correct an error in a front wheel speed or a rear wheel speed produced due to the mounting of a different-diameter wheel for a front wheel or rear wheel. A ratio between front and rear wheel speeds is calculated from an average value of left and right front wheel speeds and an average value of left and right rear wheel speeds, and when such front/rear wheel speed ratio exceeds a predetermined value, it is determined that the different-diameter wheel has been mounted, and the front wheel speed or the rear wheel speed is corrected (see Japanese Patent Application Laid-Open No. 121439/92).

In this prior art system, the left and right front wheel speeds or the left and right rear wheel speeds are uniformly corrected without specification of which wheel of the four wheels is the different-diameter wheel and hence, it is impossible to accurately correct the wheel speed of the different-diameter wheel.

SUMMARY OF THE INVENTION

The present invention has been accomplished with the above circumstance in view, and it is an object of the present invention to provide a vehicle wheel speed correcting system capable of specifying a different-diameter wheel and accurately correcting the wheel speed of the different-diameter wheel.

To achieve the above object, according to an aspect and feature of the present invention, there is provided a wheel speed correcting system, including a steady-state straight travel judging means for judging that a vehicle is in a steady-state straight travel, and a different-diameter specifying means for specifying a different-diameter wheel having a wheel speed different from that of the other wheels based on a difference in wheel speed between wheels juxtaposed laterally and a difference in wheel speed between wheels located diagonally. A wheel speed ratio calculating means calculates a wheel speed ratio between the different-diameter wheel and the other wheels, when the steady-state straight travel of the vehicle has been judged by the steady-state straight travel judging means, the different-diameter wheel has been specified by the different-diameter specifying means, and a wheel speed correcting means corrects the wheel speed of the different-diameter wheel based on an output from the wheel speed ratio calculating means.

The different-diameter specifying means specifies the different-diameter wheel based on a first yaw rate estimated from a difference in speed between the rear left and right wheels, a second yaw rate estimated from a difference in speed between the front left and right wheels, a third yaw rate estimated from a difference in speed between the front left wheel and the rear right wheel and a fourth yaw rate estimated from a difference in speed between the front right wheel and the rear left wheel.

The wheel speed of the different-diameter wheel corrected by the wheel speed correcting means is used for slip control of the driven wheels.

DETAILED DESCRIPTION OF THE PREFERRED EMBODIMENTS

Figure 1:
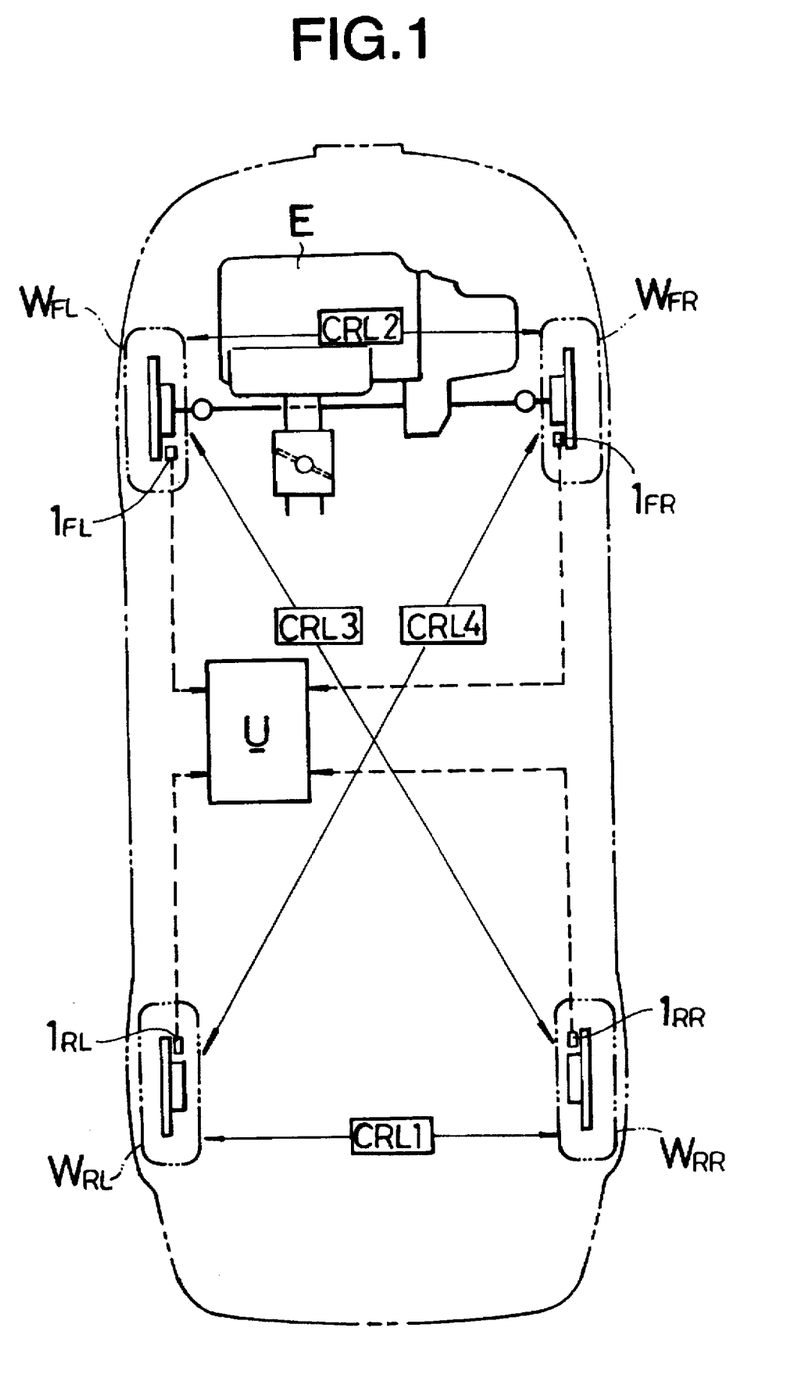
FIG. 1 is a diagrammatic illustration of a vehicle including a wheel speed correcting system of the present invention mounted thereon.

FIG. 1 shows a front wheel-drive vehicle which includes a pair of left and right driven wheels $W_{FL}$ and $W_{FR}$ (front wheels) driven by an engine E, and a pair of left and right follower wheels $W_{RL}$ and $W_{RR}$ (rear wheels) rotated with the traveling of the vehicle. A wheel speed VWFL of the left driven wheel $W_{FL}$ and a wheel speed VWFR of the right driven wheel $W_{FR}$ are detected by driven wheel speed sensors $1_{FL}$ and $1_{FR}$, and a wheel speed VWRL of the left follower wheel $W_{RL}$ and a wheel speed VWRR of the right follower wheel $W_{RR}$ are detected by follower wheel speed sensors $1_{RL}$ and $1_{RR}$.

The wheel speeds VWFL and VWFR of the left and right driven wheels $W_{FL}$ and $W_{FR}$ detected by the driven wheel speed sensors $1_{FL}$ and $1_{FR}$ and the wheel speeds VWRL and VWRR of the left and right follower wheels $W_{RL}$ and $W_{RR}$ detected by the follower wheel speed sensors $1_{RL}$ and $1_{RR}$ are provided to an electronic control unit U comprising a microcomputer. The electronic control unit U judges whether a different-diameter wheel such as a temporary tire has been mounted on the vehicle, and corrects the wheel speed of the different-diameter wheel, if one is mounted on the vehicle.

Figure 6:
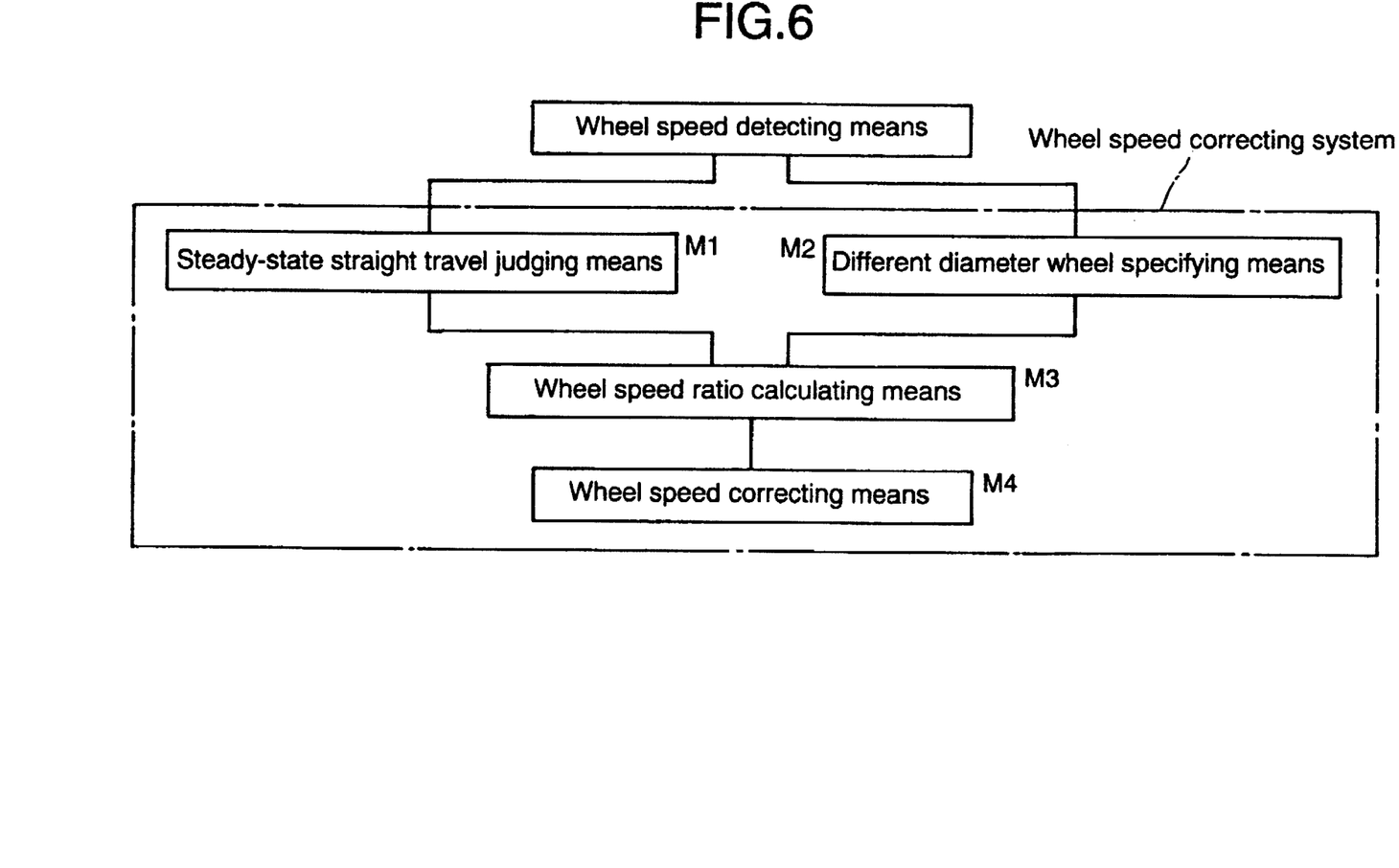
FIG. 6 is a block diagram of the wheel speed correcting system of the present invention.

As shown in FIG. 6, the wheel speed correcting system according to the present invention includes a steady-state straight travel judging means M1, a different-diameter specifying means M2, a wheel speed ratio calculating means M3, and a wheel speed correcting means M4.

The steady-state straight travel judging means M1 judges, based on a signal from the wheel speed detecting means including the driven wheel speed sensors $1_{FL}$ and $1_{FR}$ and the follower wheel speed sensors $1_{RL}$ and $1_{RR}$, whether the vehicle is in a steady-state straight travel suitable for correction of the wheel speed, rather than a speed-increasing or decreasing state or in a turning state.

The different-diameter wheel specifying means M2 specifies which wheel is a different-diameter wheel which is different in wheel speed from the other wheels, based on the signal from the wheel speed detecting means.

The wheel speed ratio calculating means M3 calculates a wheel speed ratio between the specified different-diameter wheel and the other wheels, when the vehicle is in its steady-state straight travel and the different-diameter wheel has been specified.

The wheel speed correcting means M4 corrects the wheel speed of the specified different-diameter wheel by the wheel speed ratio.

Figure 2:
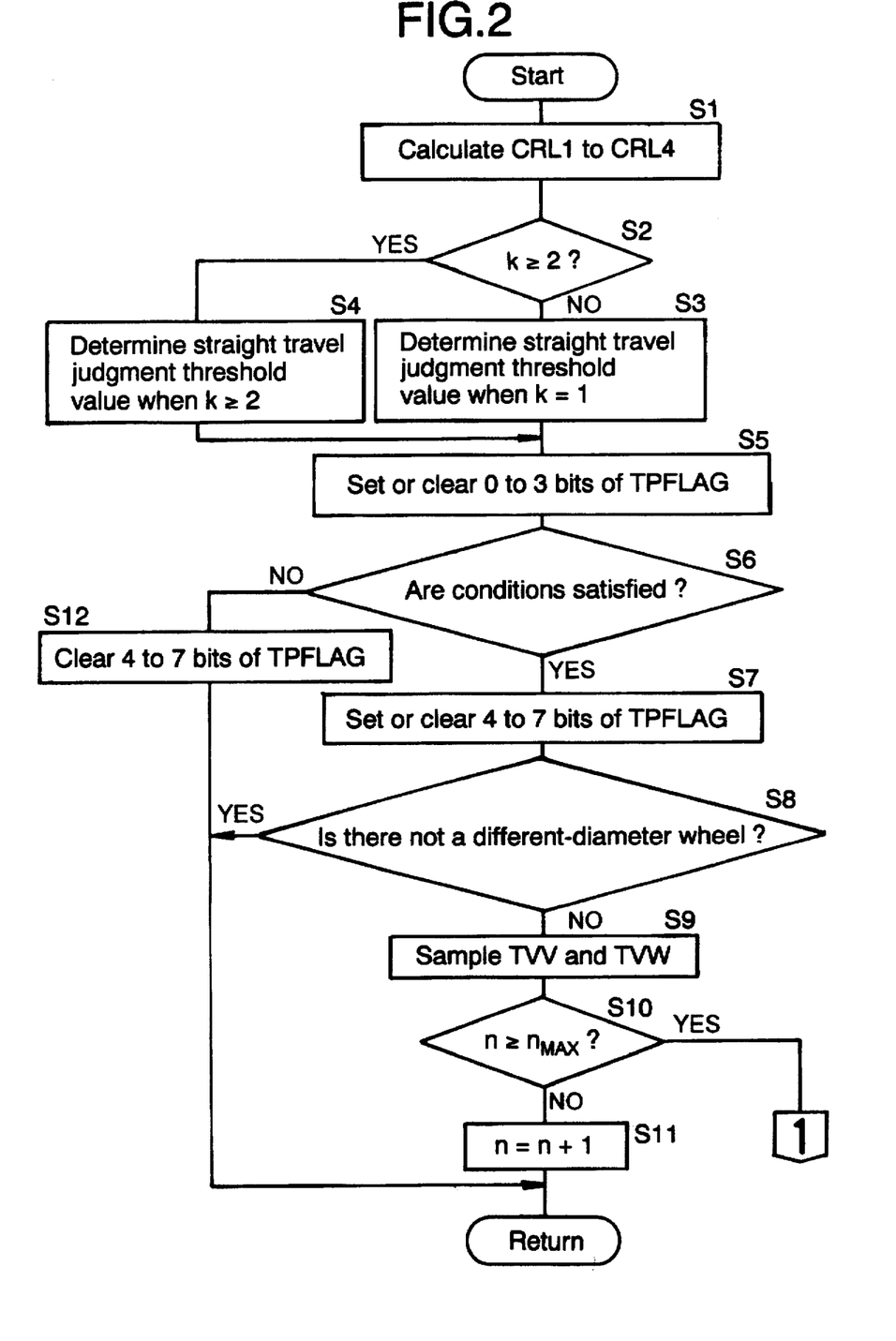
FIG. 2 is a first portion of a flow chart.
Figure 3:
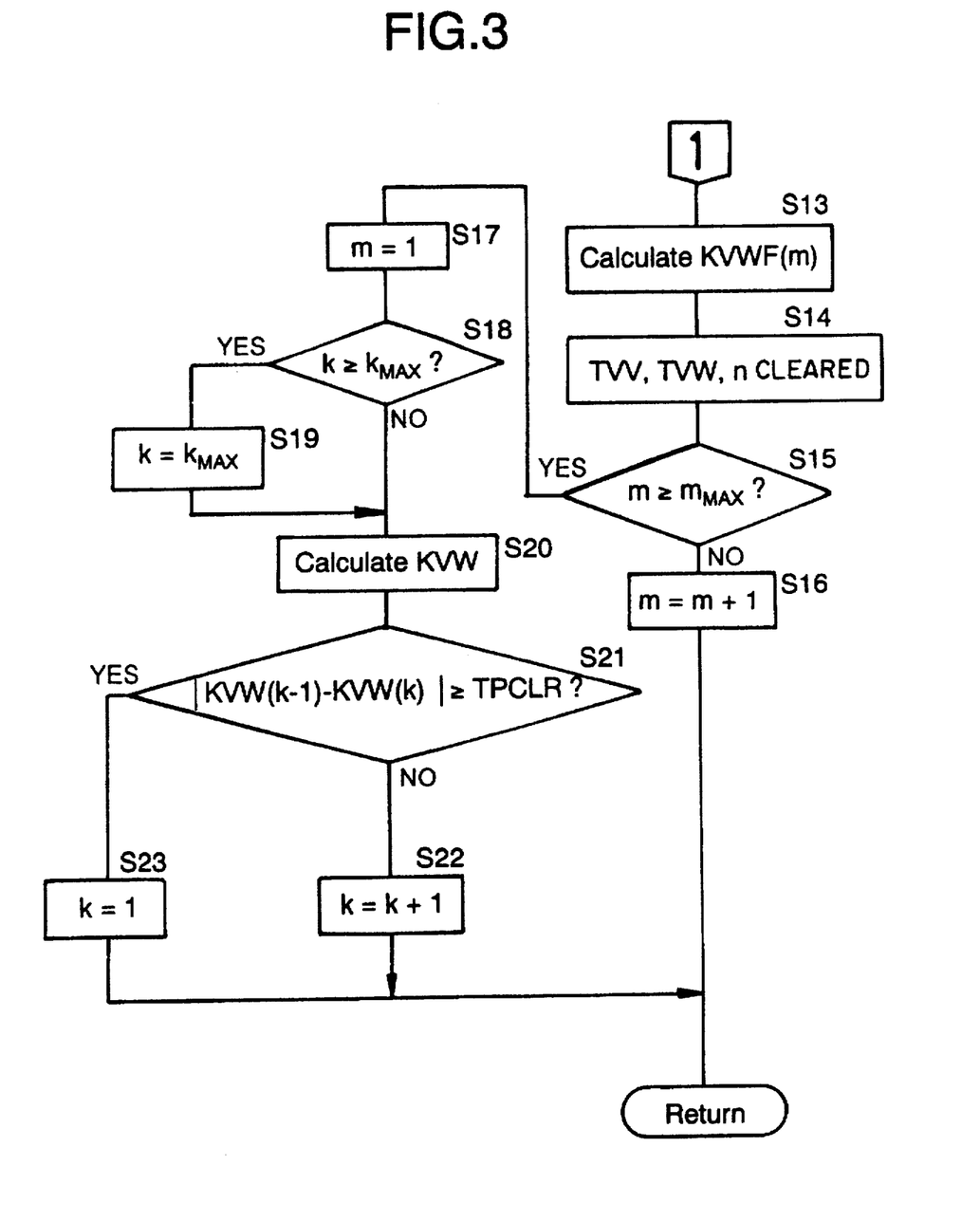
FIG. 3 is a second portion of the flow chart.
Figure 4:
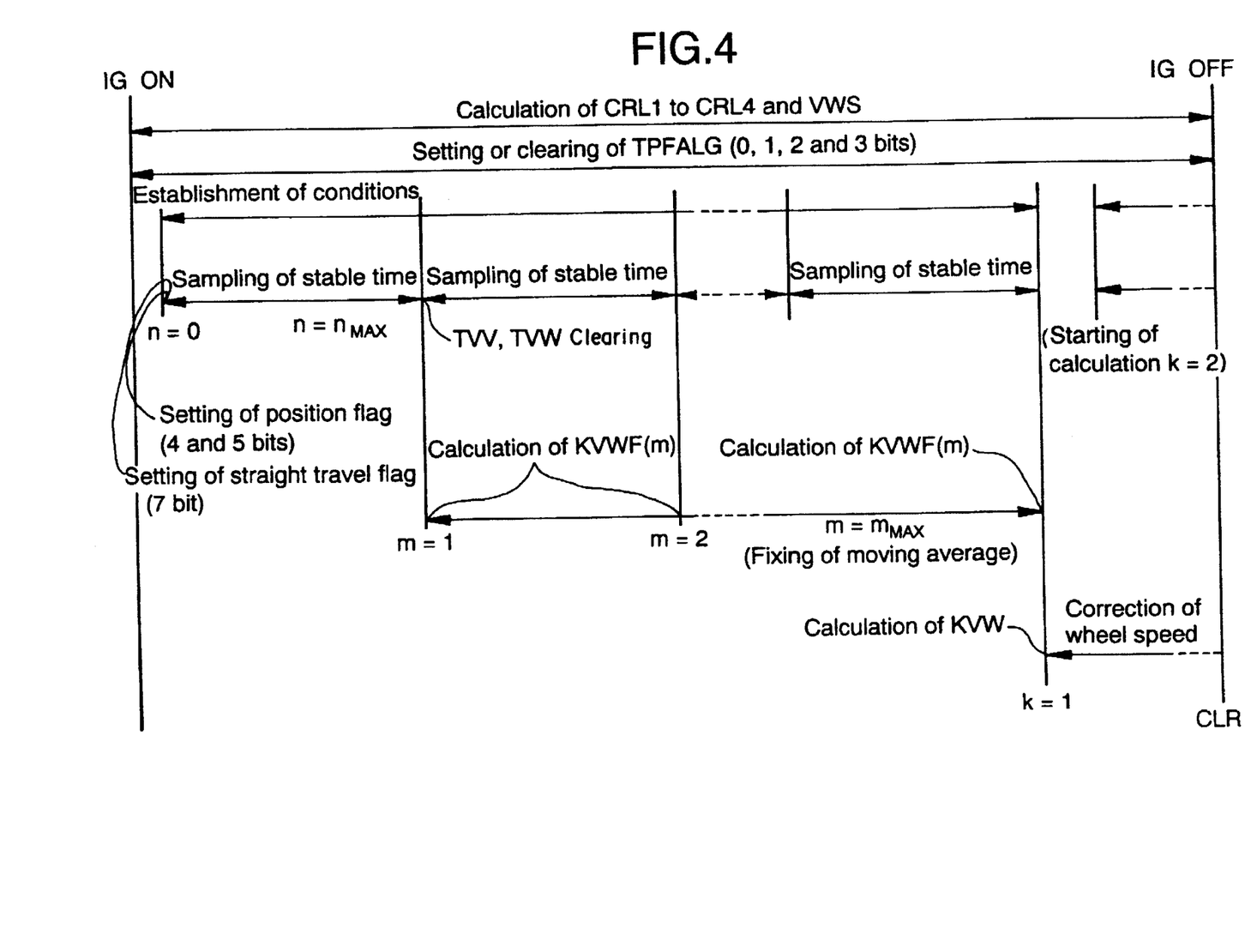
FIG. 4 is a time chart.

The operation of this embodiment of the present invention will be described below with reference to a flow chart in FIGS. 2 and 3, and a time chart in FIG. 4.

At Step S1, four yaw rates CRL1, CRL2, CRL3 and CRL4 of the vehicle are calculated. As is apparent from FIG. 1, the yaw rate CRL1 is determined based on the wheel speeds VWRL and VWRR of the left and right follower wheels $W_{RL}$ and $W_{RR}$. The yaw rate CRL2 is determined based on the wheel speeds VWFL and VWFR of the left and right driven wheels $W_{FL}$ and $W_{FR}$. The yaw rate CRL3 is determined based on the wheel speed VWFL of the left driven wheel $W_{FL}$ and the wheel speed VWRR of the right follower wheel $W_{RR}$. The yaw rate CRL4 is determined based on the wheel speed VWFR of the right driven wheel $W_{FR}$ and the wheel speed VWRL of the left follower wheel $W_{RL}$.

At Step S2, it is judged whether the number k of corrections is two or more. If k=1, straight travel judgment threshold values CRZERO1 and CRZERO2 which will be described hereinafter, are determined at Step S3. If k≧2, straight travel judgment threshold values CRZ1 and CRZ2 which will be described hereinafter, are determined at Step S4. Here, an initial value of the number k of corrections is 1, and whenever a correcting factor KVW (which will be described hereinafter) of the wheel speed is calculated, the number k of corrections is incremented and finally fixed at $k_{MAX}$ ($k=k_{MAX}$). When a following condition (1) has been established, the number k of corrections is initialized into 1.

$$|KVW(k-1)-KVW(k)| \geq TPCLR \quad (1)$$

wherein TPCLR is a constant previously stored in ROM in the electronic control unit U.

Now, if k=1 at Step S2, straight travel judgment threshold values CRZ1 and CRZ2 previously stored in the ROM in the electronic control unit U are read.

On the other hand, if k≧2 at Step S2, straight travel judgment threshold values CRZ1 and CRZ2 are calculated according to following expressions (2) and (3):

$$CRZ1(k)=\{CRZ1(k-1)+CRZEROMN1\}/2 \quad (2)$$

$$CRZ2(k)=\{CRZ2(k-1)+CRZEROMN2\}/2 \quad (3)$$

Then 0, 1, 2 and 3 bits of a different-diameter wheel flag TPFLAG are set or cleared at Step S5.

Figure 5:
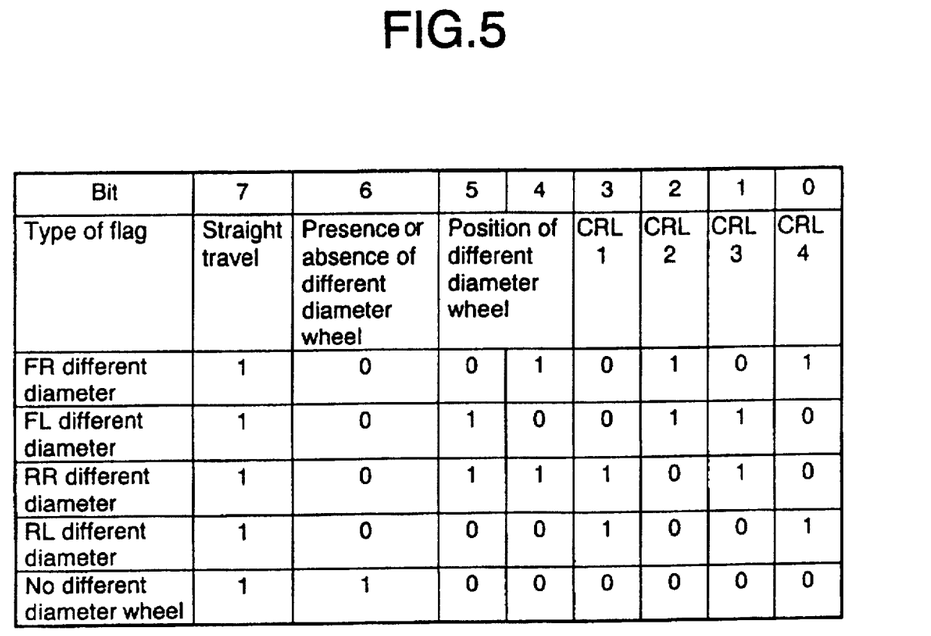
FIG. 5 is a diagram for explaining a different-diameter wheel flag.

As shown in FIG. 5, the different-diameter wheel flag TPFLAG is data of 1 byte, and each of 0, 1, 2 and 3 bits indicates whether each of the yaw rates CRL4, CRL3, CRL2 and CRL1 has exceeded a predetermined threshold value, respectively, 4 and 5 bits indicate a position of mounting of a different-diameter wheel by cooperation with each other. 6 bit indicates whether there is a different-diameter wheel mounted, and 7 bit indicates whether the vehicle is in its steady-state straight travel.

The 0 bit is cleared when the yaw rate CRL4 is in a range represented by following expressions (4a) and (4b):

$$|CRL4| \leq CRZERO1 \text{ when } k=1 \quad (4a)$$

$$|CRL4| \leq CRZ1 \text{ when } k \geq 2 \quad (4b)$$

and the 0 bit is set when the yaw rate CRL4 is in a range other than the above range.

The 1 bit is cleared when the yaw rate CRL3 is in a range represented by following expressions (5a) and (5b):

$$|CRL3| \leq CRZERO1 \text{ when } k=1 \quad (5a)$$

$$|CRL3| \leq CRZ1 \text{ when } k \geq 2 \quad (5b)$$

and the 1 bit is set when the yaw rate CRL3 is in a range other than the above range.

The 2 bit is cleared when the yaw rate CRL2 is in a range represented by following expressions (6a) and (6b):

$$|CRL2| \leq CRZERO1 \text{ when } k=1 \quad (6a)$$

$$|CRL2| \leq CRZ1 \text{ when } k \geq 2 \quad (6b)$$

and the 2 bit is set when the yaw rate CRL2 is in a range other than the above range.

The 3 bit is cleared when the yaw rate CRL1 is in a range represented by following expressions (7a) and (7b):

$$|CRL1| \leq CRZERO1 \text{ when } k=1 \quad (7a)$$

$$|CRL1| \leq CRZ1 \text{ when } k \geq 2 \quad (7b)$$

and the 3 bit is set when the yaw rate CRL1 is in a range other than the above range.

In this manner, when the yaw rate of the vehicle is substantial the 0, 1, 2 and 3 bits are set.

The 4 and 5 bits are set or cleared in accordance with the states of the 0, 1, 2 and 3 bits, and define the position of mounting of the different-diameter wheel by cooperation with each other.

For example, if a different-diameter wheel has been mounted at the position of the right driven wheel $W_{FR}$ and its wheel speed VWFR is larger than the other wheel speeds and further, the yaw rates CRL4 and CRL2 exceed the threshold values, the 0 and 2 bits are set, and in correspondence to this, the 4 bit is set and at the same time, the 5 bit is cleared in order to indicate that the position of the different-diameter wheel is at the right driven wheel $W_{FR}$.

If a different-diameter wheel has been mounted at the position of the left driven wheel $W_{FL}$ and its wheel speed VWFL is larger than the other wheel speeds and further, the yaw rates CRL3 and CRL2 exceed the threshold values, the 1 and 2 bits are set, and in correspondence to this, the 4 bit is cleared and the 5 bit is set in order to indicate that the position of the different-diameter wheel is at the left driven wheel $W_{FL}$.

If a different-diameter wheel has been mounted at the position of the right follower wheel $W_{FR}$ and its wheel speed VWRR is larger than the other wheel speeds and further, the yaw rates CRL3 and CRL1 exceed the threshold values, the 1 and 3 bits are set, and in correspondence to this, the 4 and 5 bits are set in order to indicate that the position of the different-diameter wheel is at the right follower wheel $W_{RR}$.

If a different-diameter wheel has been mounted at the position of the left follower wheel $W_{RL}$ and its wheel speed VWRL is larger than the other wheel speeds and further, the yaw rates CRL4 and CRL1 exceed the threshold values, the 0 and 3 bits are set, and in correspondence to this, the 4 and 5 bits are cleared in order to indicate that the position of the different-diameter wheel is at the left follower wheel $W_{RL}$.

When all the 0, 1, 2 and 3 bits have been cleared, 6 bit is set to indicate that no different-diameter wheel is mounted, and in other cases, the 6 bit is cleared to indicated that there is a different-diameter wheel mounted.

A 7 bit indicates whether the vehicle is in the steady-state straight travel. If the vehicle is in the steady-state straight travel, the 7 bit is set, and if the vehicle is not in the steady-state straight travel, the 7 bit is cleared.

In other words, if k=1, when any two of the four yaw rates CRL1, CRL2, CRL3 and CRL4 calculated at Step S1 meet a following expression (8):

$$|CRLa| \leq CRZERO1 \text{ and } |CRLb| \leq CRZERO1 \tag{8}$$

and the remaining two meet a following expression (9):

$$||CRLc|-|CRLd|| \leq CRXERO2 \tag{9}$$

it is determined that the vehicle is in the steady-state straight travel.

If $k \geq 2$, when any two of the four yaw rates CRL1, CRL2, CRL3 and CRL4 meet a following expression (10):

$$|CRLa| \leq CRZ1 \text{ and } |CRLb| \leq CRZ1 \tag{10}$$

and the remaining two meet a following expression (11):

$$||CRLc|-|CRLd|| \leq CRZ2 \tag{11}$$

it is determined that the vehicle is in the steady-state straight travel.

Each of characters a, b, c and d in the expressions (8) to (11) is any numeral of 1, 2, 3 and 4.

When the 0, 1, 2 and 3 bits of the different-diameter wheel flag TPFLAG have been set or cleared at Step S5, the processing is passed to Step S6 at which it is judged whether following conditions (1) to (5) for carrying out the correction of the wheel speed has been established:

(1) a device using a wheel speed as a control signal such as a traction control system is not in operation and hence, provides no control;

(2) a foot brake is not operated;

(3) a vehicle speed VV=(VWRL+VWRR)/2, determined by an average value of the wheel speeds VWRL and VWRR of the left and right following wheels, meets a following expression (12), and the vehicle speed is relatively stable, $$VTPL \leq VV \leq VTPH \tag{12}$$

wherein each of VTPL and VTPH is constant previously stored in the ROM of the electronic control unit U;

(4) it has been determined according to the above-described expressions (8) to (11) that the vehicle speed is in the steady-state straight travel; and (5) a longitudinal acceleration FG of the vehicle determined by time-differentiation of the vehicle speed VV meets a following expression (13), and the vehicle is not in acceleration and deceleration.

$$TPGMN \leq FG \leq TPGMX \tag{13}$$

wherein each of TPGMN and TPGMX is constant previously stored in the ROM of the electronic control unit U.

If all the conditions (1) to (5) are met at Step S6, sampling of a stable time is started, and the number n of samples is set at 0 (zero). At Step S7, 4 to 7 bits of the different-diameter wheel flag TPFLAG are set or cleared. The number n of samples is incremented in every loop. When the number n of samples reaches $n_{MAX}$ ($n=n_{MAX}$), it is cleared into 0 (zero), wherein $n_{MAX}$ is a constant previously stored in the ROM of the electronic control unit U.

Then it is judged at Step S8 whether there is a different-diameter wheel mounted. If it is determined by reference to the 6 bit of the different-diameter wheel flag TPFLAG that the 6 bit has been cleared and there is a different-diameter wheel mounted, the processing is passed to Steps S9, S10 and S11. At Steps S9, S10 and S11, the sampling of TVV and TVW is carried out, while incrementing the number n of samples in every loop, until it reaches $n_{MAX}$ ($n=n_{MAX}$).

Thus, when the different-diameter wheel is any one of the left and right driven wheel $W_{FL}$ and $W_{FR}$, TVV is calculated according to a following expression (14):

$$TVV = \sum_{n=0}^{n_{MAX}} \{(VWRRn + VWRLn)/2\}^2 \tag{14}$$

and TVW is calculated according to a following expression (15):

$$TVW = \sum_{n=0}^{n_{MAX}} VWFRn\,[VWFLn] \times (VWRRn + VWRLn)/2 \tag{15}$$

When the different-diameter wheel is any one of the left and right follower wheels $W_{RL}$ and $W_{RR}$, TVV is calculated according to a following expression (16):

$$TVV = \sum_{n=0}^{n_{MAX}} \{(VWFRn + VWRLn)/2\}^2 \tag{16}$$

and TVW is calculated according to a following expression (17):

$$TVW = \sum_{n=0}^{n_{MAX}} VWRRn\,[VWRLn] \times (VWFRn + VWFLn)/2 \tag{17}$$

If any of the conditions (1) to (5) is not met at Step S6 before the number n of samples reaches $n_{MAX}$ at Step S10, the 4 to 7 bits of the different-diameter wheel flag TPFLAG are cleared at Step S12, returning to Step S1.

When the number n of samples has reached $n_{MAX}$ at Step S10, the processing is advanced to Step S13, at which a correcting factor KVWF (a floating point) corresponding to the wheel speed ratio between the different-diameter wheel and the other wheels is calculated according to a following expression:

$$KVWF = TVV/TVW \tag{18}$$

The correcting factor KVWF is sequentially calculated until m reaches $m_{MAX}$ ($m=m_{MAX}$) at Step S15 while being incremented at Step S16 at every time when the number n of samples reaches $n_{MAX}$ ($n=n_{MAX}$) at Step S10. At every calculation, a moving average KVWF(m) of the correcting factor is calculated according to a following expression (19), and TVV, TVW and n are cleared at Step S14.

$$KVWF(m) = 1/m \times KVWF(m) + (1 - 1/m) \times KVWF(m-1) \tag{19}$$

If m reach $m_{MAX}$ ($m=m_{MAX}$) at Step S15, the moving average KVWF($m_{MAX}$) of the correcting factor calculated according to the expression (19) is fixed, and the value of m is returned to an initial value of 1 (m=1) at Step S17.

When the moving average $KVWF(m_{MAX})$ of the correcting factor has been calculated in the above manner in the case where k=1, a correcting factor KVW is calculated at Step S20 by fixing a decimal point to such moving average $KVWF(m_{MAX})$ of the correcting factor. When the KVW has been calculated, TPFLAG indicating such a state is stored and maintained in TPFLAG2. Then, the correcting factor KVW is sequentially renewed while incrementing k at Step S22. If the absolute value of a difference between the last value KVW(k−1) and a current value KVW(k) of the correcting factor KVW exceeds a threshold value TPCLR stored in the ROM, the value of k is returned to the initial value of 1 (k=1) at Step S23.

If the value of k reaches a threshold value $k_{MAX}$ stored in the ROM at Step S18, it is fixed at $k_{MAX}$ at Step S19, and the value of the correcting factor KVW is also fixed at a value at the time when $k=k_{MAX}$.

Thus, the wheel speed of the different-diameter wheel is corrected using the KVWF at every time when the moving average KVWF of the correcting factor is calculated at Step S13, i.e., at every time when k is renewed.

More specifically, when the different-diameter wheel is the left or right driven wheel $W_{FL}$ or $W_{FR}$, a corrected wheel speed VWFRHS (of the right driven wheel $W_{FR}$) and a corrected wheel speed VWFLHS (of the left driven wheel $W_{FL}$) are calculated according to a following expression (20):

$$VWFRHS[VWFLHS]=VWFR[VWFL] \times KVWF \quad (20)$$

When the different-diameter wheel is the left or right follower wheel $W_{RL}$ or $W_{RR}$, a corrected wheel speed VWRRHS (of the right follower wheel $W_{RR}$) and a corrected wheel speed VWRLHS (of the left follower wheel $W_{RL}$) are calculated according to a following expression (21):

$$VWRRHS[VWRLHS]=VWRR[VWRL] \times KVWF \quad (21)$$

As described above, which of the four wheels is a different-diameter is specified, and the corrected wheel speed VWFRHS, VWFLHS, VWRRHS or VWRLHS of such different-diameter wheel is determined. Therefore, it is possible to prevent an error due to the different-diameter wheel, in a control device using the wheel speed signal, for example, such as a vehicle traction control system and an ABS system, thereby providing a precise control, and especially, in a system using a combination of a traction control and a yaw rate control, it is possible to prevent a misoperation of control.

The detection of the different-diameter wheel is not limited to the detection of a temporary tire, and can be also applied to a tire having a reduced air pressure.

As discussed above, according to the present invention, when the vehicle is in the steady-state straight travel, the different-diameter wheel is specified based on the difference in wheel speed between the wheels juxtaposed laterally and the difference in wheel speed between the wheels located diagonally. The wheel speed of the different-diameter wheel is corrected based on the wheel speed ratio between the different-diameter wheel and the other wheels. Therefore, even if any of the four wheels is the different-diameter wheel, it is possible to specify the different-diameter wheel to accurately correct the wheel speed of the different-diameter wheel.

When the yaw rates are detected based on the differences in speed between the four wheels and used for judging the straight travel, it is possible to prevent the misdetection of the yaw rate due to the mounting of a different-diameter wheel.

Further, with the present invention, it is possible to accurately effect the slip control for the driven wheels.

The present invention may be embodied in other specific forms without departing from the spirit or essential characteristics thereof. The presently disclosed embodiment is therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A vehicle wheel speed correcting system for a vehicle having front and rear wheels including a wheel having a diameter different from that of the other wheels, said vehicle speed correcting system for correcting a wheel speed of said wheel having the different-diameter, said correcting system comprising:

(a) a steady-state straight travel judging means for determining that the vehicle is in a steady-state straight travel;

(b) a different-diameter wheel specifying means for specifying the different-diameter wheel having a wheel speed different from wheel speeds of the other wheels, based on 1) a difference in wheel speed between ones of the wheels juxtaposed laterally and 2) a difference in wheel speed between ones of the wheels located diagonally, wherein said different-diameter wheel specifying means specifies the different-diameter wheel based upon a first yaw rate calculated from a difference in speed between rear left and right wheels, a second yaw rate calculated from a difference in speed between front left and right wheels, a third yaw rate calculated from a difference in speed between the front left wheel and the rear right wheel and a fourth yaw rate calculated from a difference in speed between the front right wheel and the rear left wheel;

(c) a wheel speed ratio calculating means connected to an output of said steady-state straight travel judging means and connected to an output of said different-diameter wheel specifying means, said wheel speed ratio calculating means for calculating a wheel speed ratio between the wheel speed of the different-diameter wheel and the wheel speeds of the other wheels, when the steady-state straight travel of the vehicle has been determined by said steady-state straight travel judging means and the different-diameter wheel has been specified by said different-diameter wheel specifying means; and (d) a wheel speed correcting means, connected to an output of said wheel speed ratio calculating means, for correcting an error in the wheel speed of the different-diameter wheel based on the output from said wheel speed ratio calculating means, wherein said steady-state straight travel judging means determines, based on said first to fourth yaw rates, that the vehicle is in said steady-state straight travel.

2. A wheel speed correcting system according to claim 1, wherein the wheels of the vehicle include driven wheels which are driven by a power drive source and the wheel speed of the different-diameter wheel corrected by said wheel speed correcting means, is used for a slip control of the driven wheels.

3. A wheel speed correcting system according to claim 1, wherein said wheel speed correcting means for calculating a correcting factor corresponding to the wheel speed ratio between the different-diameter wheel and the other wheels and for determining a corrected wheel speed of said different-diameter wheel based upon the correcting factor.

4. A vehicle wheel speed correcting system for a vehicle having front and rear wheels including a wheel having a diameter different from that of the other wheels, said vehicle speed correcting system for correcting a wheel speed of said wheel having the different-diameter, said correcting system comprising:

(a) a steady-state straight travel judging means for determining that the vehicle is in a steady-state straight travel;

(b) a different-diameter wheel specifying means for specifying the different-diameter wheel having a wheel speed different from wheel speeds of the other wheels, based on 1) a difference in wheel speed between ones of the wheels juxtaposed laterally and 2) a difference in wheel speed between ones of the wheels located diagonally, wherein said different-diameter wheel specifying means specifies the different-diameter wheel based upon a first yaw rate calculated from a difference in speed between rear left and right wheels, a second yaw rate calculated from a difference in speed between front left and right wheels, a third yaw rate calculated from a difference in speed between the front left wheel and the rear right wheel and a fourth yaw rate calculated from a difference in speed between the front right wheel and the rear left wheel;

(c) a wheel speed ratio calculating means connected to an output of said steady-state straight travel judging means and connected to an output of said different-diameter wheel specifying means, said wheel speed ratio calculating means for calculating a wheel speed ratio between the wheel speed of the different-diameter wheel and the wheel speeds of the other wheels, when the steady-state straight travel of the vehicle has been determined by said steady-state straight travel judging means and the different-diameter wheel has been specified by said different-diameter wheel specifying means; and (d) a wheel speed correcting means, connected to an output of said wheel speed ratio calculating means, for correcting an error in the wheel speed of the different-diameter wheel based on the output from said wheel speed ratio calculating means.

* * * * *